United States Patent
Dottax et al.

(10) Patent No.: US 12,395,343 B2
(45) Date of Patent: Aug. 19, 2025

(54) SIGNATURE-FREE OPTIMIZED POST-QUANTUM AUTHENTICATION SCHEME, METHODS AND DEVICES

(71) Applicant: IDEMIA FRANCE, Courbevoie (FR)

(72) Inventors: Emmanuelle Dottax, Courbevoie (FR); Luk Bettale, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 202 days.

(21) Appl. No.: 18/165,424

(22) Filed: Feb. 7, 2023

(65) Prior Publication Data

US 2023/0261854 A1 Aug. 17, 2023

(30) Foreign Application Priority Data

Feb. 15, 2022 (FR) ..................... 22 01321

(51) Int. Cl.
*H04L 9/32* (2006.01)
*H04L 9/08* (2006.01)
(Continued)

(52) U.S. Cl.
CPC .......... *H04L 9/3234* (2013.01); *H04L 9/0822* (2013.01); *H04L 9/3226* (2013.01);
(Continued)

(58) Field of Classification Search
CPC ... H04L 9/0822; H04L 9/3226; H04L 9/3234; H04L 9/3271; H04L 2209/26; H04L 9/0852; H04L 63/083; H04L 63/0853; H04L 63/062; H04L 63/08; G06F 21/34; G06F 21/35

See application file for complete search history.

(56) References Cited

U.S. PATENT DOCUMENTS

2004/0098585 A1  5/2004  Grove et al.
2008/0065887 A1  3/2008  Grove et al.
(Continued)

OTHER PUBLICATIONS

French Preliminary Search Report issued Sep. 30, 2022 in French Application 22 01321 filed on Feb. 15, 2022 (with Written Opinion) citing documents 1-5 & 24 therein 8 pages.
(Continued)

*Primary Examiner* — Shaqueal D Wade-Wright
(74) *Attorney, Agent, or Firm* — Oblon, McClelland, Maier & Neustadt, L.L.P.

(57) ABSTRACT

A post-quantum strong authentication scheme uses a reference PIN code stored in the memory of a personal object 1. A server generates a secret ss and a corresponding cipher ct using a key encapsulation mechanism, KEM, and a public key pk of the user, and then generates a cryptographic key ss' with a one-way function, OWF, applied to the secret. An access terminal 2 receives ss' and ct, and then obtains a PIN entered by the user, encrypts the PIN with ss', and finally transmits the encrypted PIN cPIN and ct to the personal object 1. The personal object obtains ss through KEM decapsulation of ct and, with its private key sk, generates ss' with OWF, and uses it to decrypt cPIN. Verification thereof validates a first authentication factor. The personal object generates and then sends a confirmation Know(ss) of the secret to the server, validating a second authentication factor.

14 Claims, 7 Drawing Sheets

(51) Int. Cl.
*H04L 9/40* (2022.01)
*G06F 21/34* (2013.01)

(52) U.S. Cl.
CPC .......... *H04L 9/3271* (2013.01); *H04L 63/083* (2013.01); *H04L 63/0853* (2013.01); *G06F 21/34* (2013.01); *H04L 63/062* (2013.01); *H04L 2209/26* (2013.01)

(56) References Cited

U.S. PATENT DOCUMENTS

| | | |
|---|---|---|
| 2010/0100746 A1 | 4/2010 | Grove et al. |
| 2019/0138707 A1 | 5/2019 | Hiltgen |
| 2020/0233947 A1* | 7/2020 | Hiltgen ................ H04W 12/06 |
| 2020/0259647 A1* | 8/2020 | Goncalves ................ H04L 9/14 |
| 2024/0048385 A1* | 2/2024 | Prest .................... H04L 9/0833 |
| 2024/0106636 A1* | 3/2024 | Nix ....................... H04L 9/0852 |
| 2024/0235842 A1* | 7/2024 | Watson ................ H04L 9/0861 |

OTHER PUBLICATIONS

Boorghany, A. et al. "On Constrained Implementation of Lattice-Based Cryptographic Primitives and Schemes on Smart Cards", ACM Transactions on Embedded Computing Systems, vol. 14, No. 3, Article 42. Apr. 2015 (25 pages).

\* cited by examiner

SIGNATURE-FREE OPTIMIZED POST-QUANTUM AUTHENTICATION SCHEME, METHODS AND DEVICES

TECHNICAL FIELD

The present invention relates to the field of computer cryptography. It relates more particularly to the field of the strong authentication of a user.

PRIOR ART

Authentication schemes with two (or more) factors are conventionally used to control access to computer devices (a server) or physical premises.

These schemes typically combine a challenge/response session authentication with a password authentication (for example a PIN (for personal identification number) code, a single-use password) or a biometric datum (for example a fingerprint).

A user has a portable authentication object, such as a chip card or a USB key. The portable object contains, in its memory, a private and public key pair (asymmetric keys) for the challenge/response authentication and contains the password or the reference biometric datum for the second authentication.

The portable object generally additionally contains a second secret key in order to secure the transmission of the password or of the biometric datum from an access device on which the user enters this information to the portable device. This second key may be a symmetric key shared with the access device or be a private key/public key pair.

Figure 1:
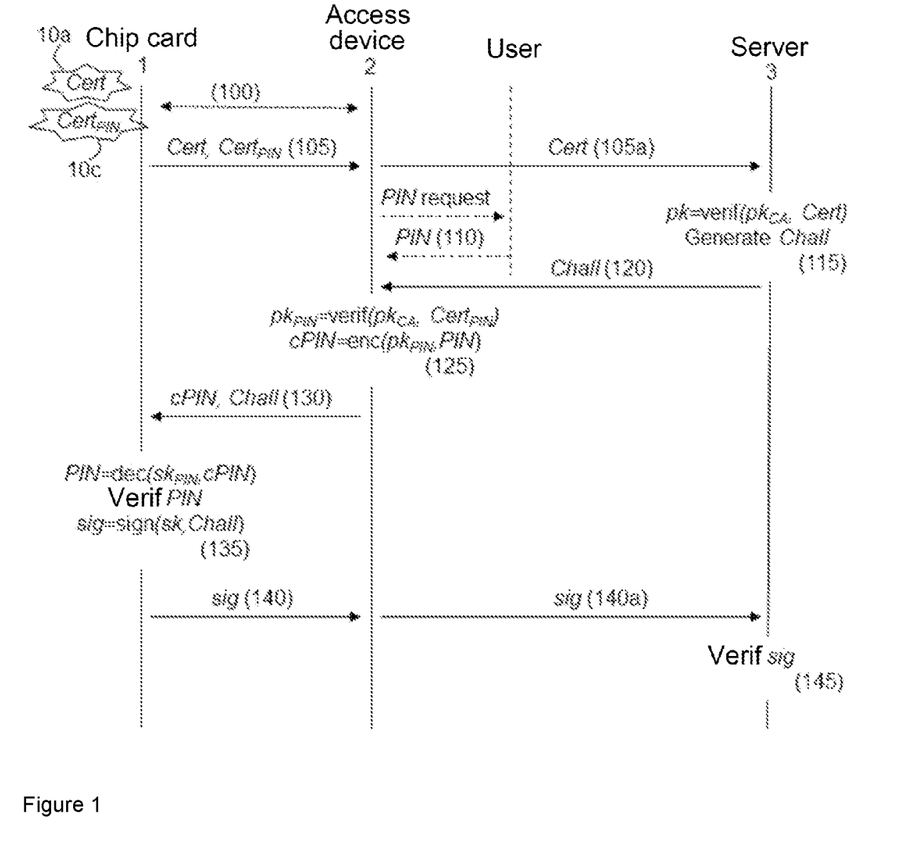
FIG. 1 illustrates a historical strong authentication scheme.

In practice, as illustrated by FIG. 1, when the user wishes to obtain access to a remote device 3, he presents for example his chip card 1 to the access device 2, for example a terminal equipped with a contact-based or contactless reader. The user enters his PIN password or the like on the terminal, which sends the password (cPIN) encrypted with the second key $pk_{PIN}$ to the card for verification. In the affirmative case, the card proceeds with the authentication of said user with the remote device by signing, with the first private key sk, a challenge Chall that is sent by the remote device.

These traditional authentication schemes are undermined with the emergence of quantum computers. Although the security of symmetric cryptographic algorithms is affected only by a factor of 2 in terms of key sizes by quantum attacks, it is reduced considerably for public-key algorithms.

There is a desire to adapt these traditional schemes to post-quantum cryptography. Some candidate post-quantum cryptographic algorithms are currently being proposed in the course of a competition organized by the NIST (National Institute of Standards and Technology), in particular post-quantum key encapsulation mechanisms or "post-quantum KEM".

KEM is a mechanism allowing the safe transmission of a secret to a partner using asymmetric algorithms.

Therefore, it is proposed to use a post-quantum KEM to secure the transmission of the encrypted password between the access device and the portable object.

Moreover, some post-quantum authentication solutions that implement a post-quantum KEM instead of traditional challenge signatures have been proposed.

Figure 2:
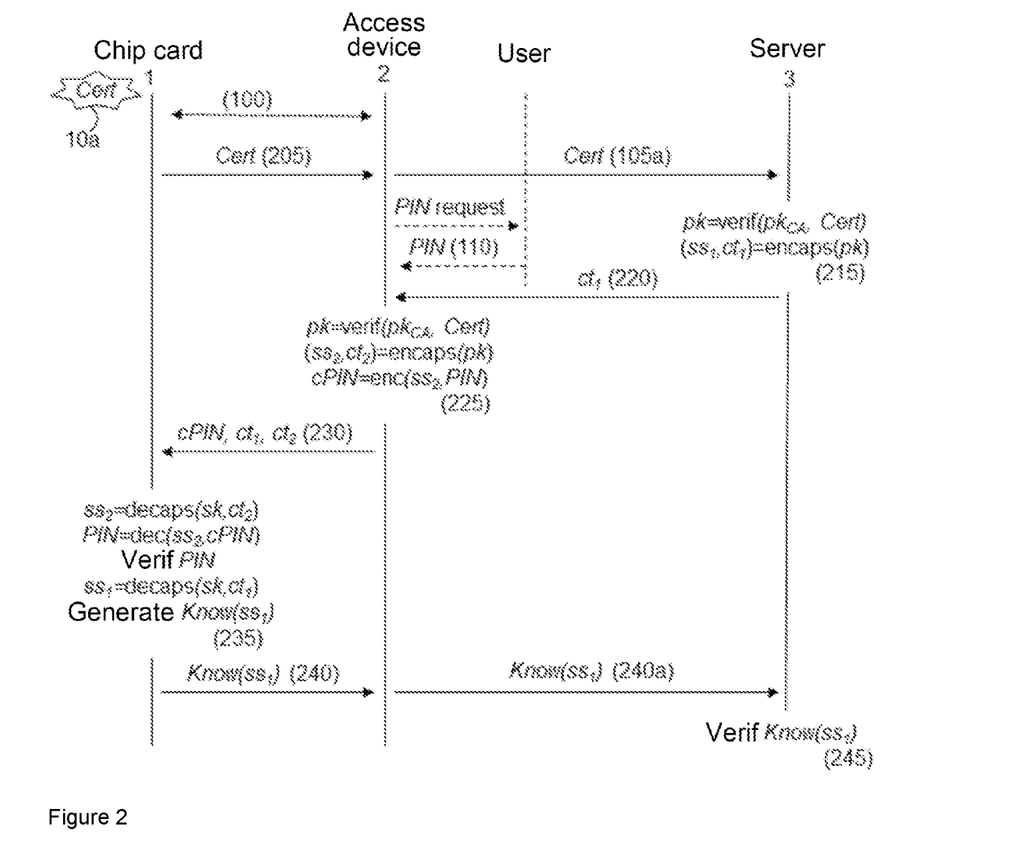
FIG. 2 illustrates a strong authentication scheme implementing post-quantum operations, inspired by known techniques.

Implementing these various techniques leads to a two-factor authentication scheme as illustrated in FIG. 2 that requires only a single key pair (pk, sk) in the chip card 1.

The server generates a secret $ss_1$ and its cipher $ct_1$, using the encapsulation function of a KEM and the public key pk, and communicates the cipher $ct_1$ to the access device. The cipher $ct_1$ is used to authenticate the chip card with the server.

The access device also generates a second secret $ss_2$ and its cipher $ct_2$ using the encapsulation function of a KEM and the same public key. Since the encapsulation function is not deterministic, $(ss_2, ct_2)$ is different from $(ss_1, ct_1)$. The second secret $ss_2$ is used as key for encrypting the PIN code entered by the user, to give the cipher cPIN. The ciphers $ct_1$, $ct_2$ and cPIN are then transmitted to the chip card.

Said chip card uses the KEM decapsulation function with the private key sk to retrieve the secrets $ss_1$ and $ss_2$. cPIN is decrypted using $ss_2$ to retrieve the PIN code that is entered, which is compared with the reference PIN code in the memory of the chip card.

In the case of a valid PIN code, a confirmation $Know(ss_1)$ of the secret $ss_1$ is sent to the server to prove that the chip card possesses the secret $ss_1$. This confirmation is verified by the server. The authentication of the user is effective in the event of a positive verification, just like the positive verification of the signature of the challenge in traditional schemes.

This two-factor authentication scheme based on the KEM is not fully satisfactory insofar as it overburdens the chip card. There is therefore a need to improve it while still retaining its properties.

SUMMARY OF THE INVENTION

The invention aims to reduce the processing operations on the chip card by invoking the KEM decapsulation function just once rather than twice. Therefore, the encapsulation function will be called once, making it necessary to link the two authentication mechanisms appropriately in order to retain the properties of the protocol.

The invention therefore relates to a method for authenticating a user with a remote device, comprising the following steps on a portable object storing a reference personal authentication datum:
  receiving, from an access device, an encrypted personal authentication datum and a cipher generated by the remote device. This is for example the cipher cPIN of the PIN code entered by the user accompanied by the cipher $ct_1$,
  decrypting the encrypted personal authentication datum using a cryptographic key,
  in the event of a valid personal authentication datum, sending, to the remote device, a confirmation of a secret (ss1 in the above example) obtained using a key encapsulation mechanism, KEM, applied to said cipher.

The invention also relates, on the part of an access device (for example a terminal) and a remote device (for example a server), to a method for authenticating a user with a remote device, using a portable object storing a reference personal authentication datum, comprising the following steps:
  generating, by way of the remote device, a secret and a corresponding cipher using a key encapsulation mechanism, KEM, and a public key of the user,
  obtaining, by way of an access device connected to the portable object, a personal authentication datum entered by the user,
  encrypting the entered personal authentication datum by way of the access device and using a cryptographic key, transmitting, to the portable object, the encrypted authentication datum and the cipher corresponding to the secret, receiving, in return, a confirmation of the secret from the portable object.

The methods according to the invention are characterized in that the cryptographic key (for encrypting the PIN code or decrypting cPIN) is generated by applying a one-way function to a secret derived from the secret obtained using the KEM.

The encryption of the authentication datum is thus based on the secret used for the authentication with the remote device (server), and not on a separate secret as is the case in known techniques. This makes it possible to reduce the data to be transmitted to the portable object, but also to avoid expensive execution of the KEM decapsulation function.

This authentication scheme retains control, by the remote device, of the authentication based on asymmetric cryptography. Furthermore, the authentication datum (for example a PIN code or password) remains protected when it is exchanged between the access device and the portable object.

In correlation, the invention also relates to a personal authentication device for authenticating a user with a remote device, comprising a memory storing a reference personal authentication datum and a processor configured to:
receive, from an access device, an encrypted personal authentication datum and a cipher generated by the remote device,
decrypt the encrypted personal authentication datum using a cryptographic key,
in the event of a valid personal authentication datum, send, to the remote device, a confirmation of a secret obtained using a key encapsulation mechanism, KEM, applied to said cipher,
characterized in that it is furthermore configured to generate the cryptographic key by applying a one-way function to a secret derived from the secret obtained using the KEM.

The invention likewise also relates to an authentication system (for example an access terminal and a remote server) for authenticating a user using a portable object storing a reference personal authentication datum, comprising an access device and a remote device,
the remote device comprising a processor configured to:
generate a secret and a corresponding cipher using a key encapsulation mechanism, KEM, and a public key of the user,
authenticate the portable object by verifying a confirmation of the secret issued by the portable object, and
the access device being connected to the portable object and comprising a processor configured to:
obtain a personal authentication datum entered by the user,
encrypt the entered personal authentication datum using a cryptographic key,
transmit, to the portable object, the encrypted authentication datum and the cipher corresponding to the secret,
receive, in return, the confirmation of the secret from the portable object,
the authentication system being characterized in that it is configured to generate the cryptographic key by applying a one-way function to a secret derived from the secret obtained using the KEM.

Optional features of the embodiments of the invention are defined in the appended claims. Some of these features are explained below with reference to a method, though they may be transposed into device features.

In one embodiment, the method, on a portable object, furthermore comprises the following step: obtaining the secret through KEM decapsulation of the cipher using a private key of a private key/public key scheme stored in the memory of the portable object.

In another embodiment, the method, on a portable object, furthermore comprises the following step: verifying the decrypted personal authentication datum with the reference personal authentication datum.

In another embodiment, the method, on a portable object, furthermore comprises the following step: generating the secret confirmation by applying a hash function to the obtained secret or to any other key derived from the obtained secret, or by encrypting a predetermined datum using the obtained secret or any other key derived from the obtained secret.

In another embodiment, the cryptographic key is generated by the remote device and transmitted thereby to the access device. This allows said access device to encrypt the personal authentication datum, without disclosing the secret and without requiring the expensive execution of the KEM decapsulation function on the access device.

In another embodiment, the method, on the access system, furthermore comprises verifying, by way of the remote device, the secret confirmation received in return, with the generated secret, so as to positively authenticate the portable object in the event of a positive verification.

In one embodiment of the invention, the derived secret is the secret obtained using the KEM.

In one hybrid embodiment, the derived secret combines the secret obtained using the KEM with at least one second secret shared between the portable object and the remote device and obtained using a pre-quantum cryptographic algorithm. The authentication thus proposed guarantees a minimum security level equal to the strongest of the security levels offered between pre-quantum cryptography and post-quantum cryptography (via the KEM).

In particular, the second shared secret may be obtained using an elliptic curve Diffie-Hellman key exchange, also known by the name ECDH.

Moreover, the secret confirmation may be based on the secret obtained using the KEM and on the second shared secret, and typically be based on the abovementioned derived secret.

At least some of the methods according to the invention may be computer-implemented. As a result, the present invention may take the form of an embodiment completely in the form of hardware, of an embodiment completely in the form of software (comprising firmware, resident software, microcode, etc.) or of an embodiment combining software and hardware aspects, which may then all together be called a "circuit", "module" or "system" here. The present invention may additionally take the form of a computer program product incorporated into any tangible expression medium having a program code able to be used by a computer incorporated into the medium.

Given that the present invention may be implemented in software, the present invention may be incorporated in the form of computer-readable code to be supplied to a programmable apparatus on any appropriate medium. A tangible or non-transient medium may comprise a storage medium such as a hard drive reader, a magnetic tape device or a semiconductor memory device and the like. A transient medium may comprise a signal such as an electrical signal, an electronic signal, an optical signal, an acoustic signal, a magnetic signal or an electromagnetic signal, for example a microwave or RF (radiofrequency) signal.

BRIEF DESCRIPTION OF THE DRAWINGS

Other particular features and advantages of the invention will become more clearly apparent from the following description, which is illustrated by the appended figures, which illustrate some non-limiting exemplary embodiments thereof.

DETAILED DESCRIPTION

The present invention relates to a method for the strong authentication of a user holding an asymmetric key pair and a personal authentication datum. This information may be stored within a personal portable object.

The present method is said to have strong authentication as it combines "something that the user possesses", i.e. a private key present in the portable object, and "something that the user is/knows", specifically a personal authentication datum, for example a PIN code, password/passphrase or biometric trait.

Although the following description is based on two authentication factors (one based on asymmetric cryptography, the other on the authentication datum), the invention may be applied to a larger number of combined authentication factors, for example by providing two or more authentication data (PIN code and biometric trait).

Moreover, the description below is based on the use of digital certificates to broadcast knowledge of the public key (associated with the above private key) to the remote device in particular. Indeed, the certificate contains the public key of the user and is certified, through a signature, by a third-party entity. Of course, other mechanisms for propagating the public key to the remote device may be contemplated (manual configuration, etc.).

The invention is advantageously used with post-quantum algorithms. However, it may also be used with conventional cryptographic algorithms that are not post-quantum.

Strong authentication is used in many security applications, typically to access a remote server or to control access to protected premises.

Figure 3:
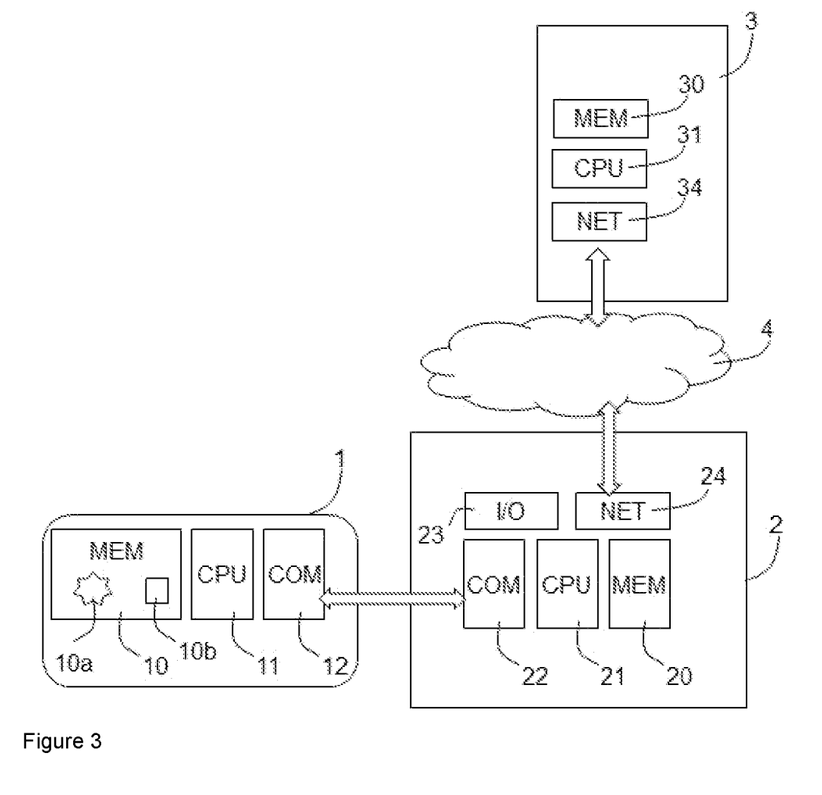
FIG. 3 schematically shows one example of an architecture of an authentication system for implementing the invention.

FIG. 3 schematically shows an architecture of an authentication system for implementing strong authentication schemes with two (or more) factors. This system comprises at least a personal portable object 1, an access device or client equipment item 2, and a remote device, typically a server 3 to which the access device 2 is able to connect via a network 4 such as the Internet.

The personal portable object 1 is an electronic device personal to an individual (numerous individuals may each possess such an object), and preferably constitutes an official identification element, advantageously issued by an authority typically implementing the server 3 and the associated (access) service. This portable object 1 may take various forms depending on the intended uses and comprises, in its memory 10, an asymmetric key pair (sk, pk) associated with the individual along with a reference personal authentication datum 10b. In the figure, the asymmetric key pair is represented by a digital certificate Cert 10a.

In a manner known per se, the electronic certificate 10a is a dataset containing at least the public key pk, identification information regarding the individual and at least one signature of these data that is constructed from the private key of a certification entity.

According to one embodiment, the portable object 1 takes the form of a chip card (of "smart card" type) with the standard dimensions and generally made of PVC or polycarbonate, or any connected object containing a chip. According to other embodiments, the portable object 1 takes the form of a USB key, a dongle or a hardware token. Regardless of the form, the portable object 1 comprises a memory MEM 10 storing in particular code and software for implementing a strong authentication method, a secure processor CPU 11 for executing the code and a contact-based (for example ISO 7816, USB) or contactless (for example ISO 14443) communication interface COM 12. These elements may be grouped into a chip within the portable object 1.

The communication interface COM 12 allows communication to be set up with a correspondence interface COM 22 when the portable object 1 is presented to the access device 2.

The interface COM 22 may include a contact-based or contactless card reader when the portable object 1 is a chip card. As a variant, it may be a simple USB interface for a USB portable object 1.

The access device 2 is a local terminal, for example a user terminal, a cell phone or smartphone, a tablet, a personal assistant, a desktop or laptop computer, an interactive terminal, accessible to the user to request access to a service, device or premises by implementing strong authentication.

The access device 2 comprises, in addition to the communication interface COM 22 for communicating with any portable object 1 that is presented, a memory MEM 20 storing code and software for implementing a strong authentication method, a processor CPU 21 for executing the code, a user interface 23 allowing the user to enter or acquire one or more personal authentication data and a communication interface NET 24 for communicating with the remote device 3 via the network 4.

The user interface 23 may be of various types depending on the nature of the authentication datum or of the authentication data to be entered/acquired and the needs to interact with the system to carry out an authentication with a view to the requested access. The user interface 23 may typically comprise one or more equipment items from among:
- a keypad or a touchscreen for entering a personal code,
- a display screen,
- a biometric acquisition means. The biometric trait may for example be the shape of the face, a fingerprint, a palm print, an iris of the individual, etc. Therefore, the acquisition means may take various forms: scanner, photographic camera, camera, fingerprint reader, etc.

In any case, a reference authentication datum used for the authentication 10b of the user is advantageously a datum pre-recorded in the memory 10 of the portable object 1. The reference datum is the one that is correct and with which an authentication datum entered by the user or acquired therefrom is compared in order to validate or not validate an authentication factor.

In the remainder of the description, reference will be made preferably to a PIN code authentication datum for the sake of conciseness. However, a person skilled in the art is able to use any other type of authentication datum, a passphrase or password, a single-use word, a biometric datum, etc.

The remote device 3 is a secure remote equipment item, typically a server providing a secure service, for example a server belonging to a bank, a hotel, etc. It conventionally comprises a memory MEM 30 storing code and software for implementing the service including a strong authentication method, a processor CPU 31 for executing the code, a network interface NET 34 for communicating with any access device 2 via the network 4.

The communication between the access device 2 and the server 3 is preferably secured via a secure channel through encryption and/or an integrity mechanism.

FIG. 1 illustrates a traditional two-factor strong authentication scheme. The portable object 1 may for example be a connected object containing a contactless communicating chip or a FIDO2 authentication USB key.

In any case, the portable object 1 is presented (100) to the access device 2.

The connected object is presented to a chip card reader fitted to the access device 2. The FIDO2 USB key is inserted into a USB port.

The portable object 1 comprises the certificate Cert 10a corresponding to the key pair (pk, sk) intended for the authentication with the server 3, but also a second digital certificate $Cert_{PIN}$ 10c corresponding to another key pair ($pk_{PIN}$, $sk_{PIN}$) intended to secure the transmission of the user PIN code to the object 1. As a variant of the second digital certificate $Cert_{PIN}$ 10c, the portable object 1 may comprise a secret/key 10c shared with the access device 2 when the PIN code is secured through a symmetric cryptographic algorithm. The explanations below are based on the use of the digital certificate, but they apply to the use of a symmetric cryptographic algorithm, using adaptations that are conventional to a person skilled in the art.

In response to the portable object 1 being put in communication with the access device 2, the former transmits (105), in a conventional manner, the digital certificates Cert 10a and $Cert_{PIN}$ 10c in order to propagate the public keys pk and $pk_{PIN}$. The certificate Cert is retransmitted (105a) to the server 3 so that said server has knowledge of the public key pk.

When requesting access to a service, server or premises, the user enters (110) his personal PIN code.

In parallel and in response to the received certificate Cert 10a, the server 3 verifies (115) the received certificate and, in the event of a valid certificate, generates and transmits (120) an authentication challenge Chall to the access device 2.

Likewise, the access device 2 verifies the received certificate $Cert_{PIN}$ 10c. In the event of a valid certificate or shared secret/key for symmetric encryption, the access device 2 encrypts the entered PIN code using the public key $pk_{PIN}$ associated with the verified certificate or using the shared secret/key. The encrypted PIN code is denoted cPIN:

cPIN=enc($pk_{PIN}$, PIN). This is step 125. Any conventional symmetric or asymmetric encryption algorithm may be used.

For example, the PIN code may be encrypted using a secure channel between the access device 2 and the portable object 1. The channel may be opened on the basis of information linked to the card access number (CAN) or to the machine-readable zone (MRZ), in which case it may be BAC ("Basic Access Control") or PACE ("Password Authenticated Connection Establishment") as defined by the ICAO ("International Civil Aviation Organization").

As a variant, the PIN code may be encrypted using a shared secret/key obtained using the ECDH ("Elliptic-curve Diffie-Hellman") algorithm.

The cipher cPIN and the challenge Chall are transmitted (130), via the card reader or the USB connection, to the portable object 1 via the card reader or the USB connection.

Upon receipt, on the one hand, the portable object 1 decrypts cPIN using either the private key $sk_{PIN}$ or the shared secret/key in order to obtain the entered PIN code: PIN=dec($sk_{PIN}$, cPIN). The latter is then compared with the reference PIN code 10b in the memory MEM 10 of the portable object 1. In the event of identical PIN codes, the first authentication factor is validated. On the other hand, the portable object 1 signs the authentication challenge Chall with its private key sk corresponding to the public key pk that the server 2 possesses: sig=sign($s_k$, Chall). This is step 135.

The signature sig, as response to the challenge, is transmitted to the server 3 (140a) via the access device 2 (140). The verification (145) of the signature by the server 3 using the public key pk (verif(pk,sig)) makes it possible to validate the second authentication factor with the server.

The emergence of quantum cryptography is making asymmetric encryption mechanisms non-secure. There is therefore a desire to adapt the traditional scheme above to post-quantum cryptography. Some candidate post-quantum cryptographic algorithms were proposed in the course of a competition organized by the NIST (National Institute of Standards and Technology), in particular post-quantum key encapsulation mechanisms or "post-quantum KEM".

A key encapsulation mechanism allows the safe transmission of a secret to a partner using asymmetric cryptographic algorithms. In a known manner, it generally comprises three algorithms or "methods" or "functions":

(asymmetric) key generation,
encapsulation, and
decapsulation.

Typically, a KEM mechanism between two parties proposes that the first party use the public key of the other party and the KEM mechanism encapsulation method to generate a random secret ss and a cipher ct of this secret. The cipher is transmitted to the other party, who is able, through decapsulation using their private key, to retrieve the secret ss thus shared.

The security in the traditional scheme may involve implementing a KEM to transmit the entered PIN code to the portable object 1.

Furthermore, some asymmetric cryptography-based post-quantum authentication solutions, based on a KEM and no longer on the signature of a challenge, have been proposed and may be substituted for the challenge/response from the traditional scheme above. Post-quantum signatures specifically require phenomenal key sizes and/or phenomenal intermediate variable sizes, and therefore consume a great deal of random access memory.

FIG. 2 illustrates the two-factor strong authentication scheme resulting from the adaptation of that from FIG. 1 to these post-quantum techniques. The same references denote the same elements or steps.

With the adoption of the KEM mechanism, the two secrets used for the two authentication factors are generated by the KEM encapsulation function from the public key pk of the portable object 1. The latter no longer needs to store only one asymmetric key pair, and transmits (205) only the certificate Cert to the access device 2.

In comparison with the traditional scheme, the server no longer generates (215) a challenge Chall, but a secret $ss_1$ and its cipher $ct_1$ using the KEM encapsulation function: $(ss_1, ct_1)$=encaps(pk). It is this cipher $ct_1$ that will be communicated to the portable object 1 for it to prove, by obtaining the secret $ss_1$, that it is indeed the holder of the private key sk, and thus validate the authentication.

The cipher $ct_1$ is therefore transmitted (220) first to the access device 2.

Said access device, which has to encrypt the PIN code entered by the user, in turn generates another secret $ss_2$ (which will be used as key to encrypt the PIN code) and its cipher $ct_2$, again using the KEM encapsulation function and the public key pk: $(ss_2, ct_2)$=encaps(pk). The PIN code is then encrypted with the secret $ss_2$: cPIN=enc($ss_2$, PIN). This is modified step 225.

The encrypted PIN code cPIN along with the ciphers $ct_1$ (for carrying out the authentication with the server) and $ct_2$ (for decrypting cPIN) are transmitted (230) to the portable object 1.

The latter retrieves the encryption key using the KEM mechanism decapsulation function applied to $ct_2$ and its private key $s_k$: $ss_2$=decaps($s_k$, $ct_2$), and then decrypts cPIN using this key to obtain the entered PIN code: PIN=dec($ss_2$, cPIN). A conventional comparison between the PIN code thus retrieved and the reference PIN code 10b is carried out in order to validate or not validate the first authentication factor.

On the other hand, if the first authentication is validated, the operations continue in order to carry out the authentication with the server 3, with the portable object 1, which retrieves the secret $ss_1$ shared with the server 3 using the KEM decapsulation function applied to $ct_1$ and its private key sk: $ss_1$=decaps(sk, $ct_1$) and generates a secret confirmation Know($ss_1$).

The secret confirmation is information based on the secret $ss_1$ that proves that the portable object 1 indeed has knowledge thereof, allowing the server to validate the authentication based on the asymmetric key pair (represented by the digital certificate). Various functions may be used to implement the function Know generating the secret confirmation.

For example, the identity function may be used: Know($ss_1$)=$ss_1$. Since the secret is used only for authentication, its disclosure here at the end of the process is not harmful.

In other examples, a hash function applied to the secret, typically an SHA (for "Secure Hash Algorithm") from the SHA-2 family or from the SHA-3 family specified by the NIST, may be used: Know($ss_1$)=SHA($ss_1$).

As another variant, an encryption operation, for example AES (for "Advanced Encryption Standard"), performed on a predetermined datum with the key $ss_1$ may be used: Know($ss_1$)=$AES_{ss1}$(data).

These operations performed by the portable object 1 are carried out in step 235. The secret confirmation is transmitted to the server 3 (240a) via the access device 2 (240). The verification (245) of the confirmation by the server 3 (by applying the same function Know to the secret $ss_1$) makes it possible to validate the second authentication factor with the server 3.

However, it is desirable to improve this post-quantum two-factor strong authentication scheme in order to reduce the computing operations on the portable object 1 (typically two decapsulations), which generally has limited resources. However, the properties of the protocol have to be retained: authentication of the portable object by the server, not exposing the PIN code to attacks.

According to the invention, the cryptographic encryption key ($ss_2$ above) is generated by applying a one-way function to a secret derived from the secret $ss_1$ obtained using the KEM and used to generate the secret confirmation. In other words, the encryption of the PIN code (or of any authentication datum) is based on the secret used for the authentication with the server 3, and not on a separate secret as is the case in known techniques. This makes it possible to reduce the data to be transmitted to the portable object 1 in step 230, but also to avoid expensive execution of the decapsulation function decaps.

Figure 4:
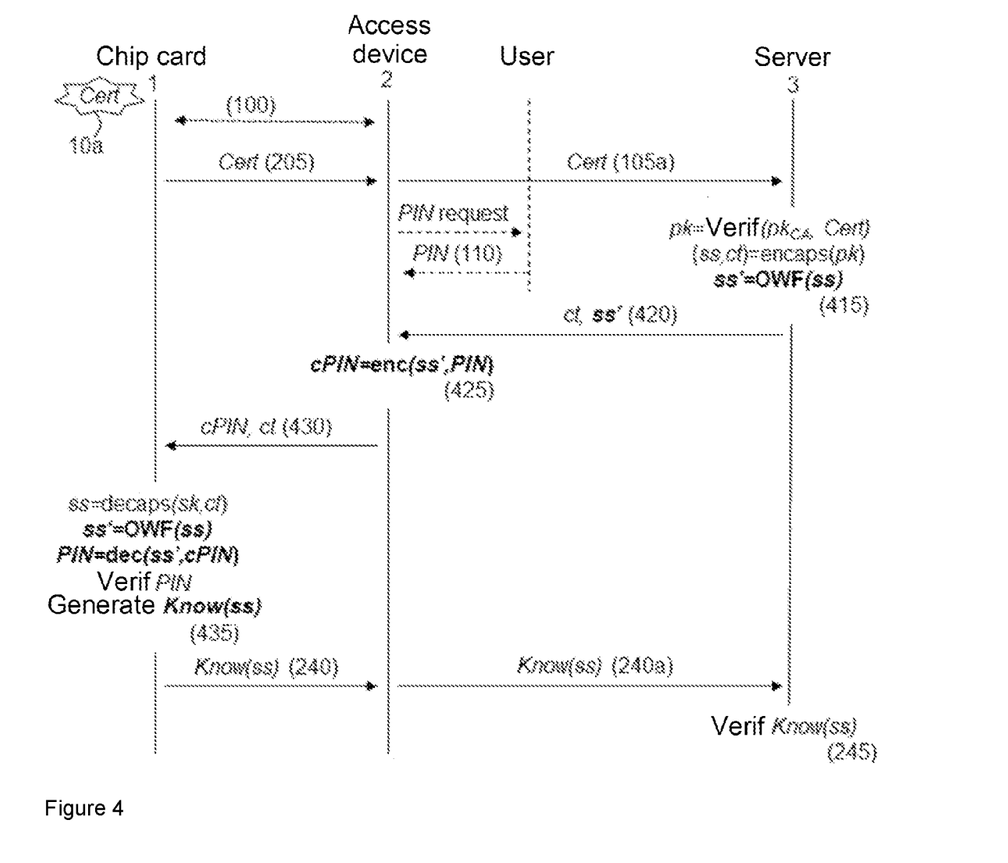
FIG. 4 illustrates a strong authentication scheme according to one implementation of the invention.

FIG. 4 illustrates a two-factor strong authentication scheme according to one embodiment of the invention. In this embodiment, the derived secret is the secret obtained using the KEM.

In step 415, in addition to retrieving the public key pk and generating the authentication secret ss and its cipher ct ((ss, ct)=encaps(pk)), the server 3 generates the encryption key, denoted ss', that will be used to protect the entered PIN code, directly from the secret ss and using a one-way function OWF: ss'=OWF(ss).

A one-way function is difficult to invert, meaning that the parameter ss is kept secret even when the result ss' is disclosed. By way of example, the one-way function may be a hash function, for example an SHA from the SHA-2 family or from the SHA-3 family specified by the NIST.

The encryption key ss' is then transmitted to the access device 2, with the cipher ct for the server authentication (step 420).

The access device now only has to encrypt (425) the PIN code with this key (cPIN=enc(ss', PIN)), also simplifying its operations. The ciphers cPIN and ct are transmitted to the portable object 1, reducing the volume of data exchanged in this step 430.

The portable object 1 may then retrieve (435) the secret ss and the encryption key ss' by using, in succession, the KEM mechanism decapsulation function with its private key $s_k$, and then the same one-way function:

$$ss=\text{decaps}(sk, ct),$$

$$ss'=\text{OWF}(ss)$$

The portable object 1 then has the two secrets needed for the two authentication factors.

Still in step 435, it decrypts cPIN using this key ss' to obtain the entered PIN code: PIN=dec(ss•, cPIN). A conventional comparison between the PIN code thus retrieved and the reference PIN code 10b is carried out in order to validate or not validate the first authentication factor. If this first authentication is validated, the operations continue with the generation of the secret confirmation Know(ss).

The function Know may simply be a message authentication code (MAC) applied to a pre-established datum using the secret ss or any other key ss" derived from ss (server and portable object knowing the derivation method to be applied symmetrically). Such another derived key could advantageously be used for a secure channel between the portable object 1 and the server 3, once the authentication has been confirmed.

It may also be a hash function applied to the secret ss or to any other key ss" derived from ss. Typically, an SHA from the SHA-2 family or from the SHA-3 family specified by the NIST.

It may also be an encryption operation, for example AES, performed on a predetermined datum with the secret ss or any other key ss" derived from ss.

The function Know(ss) is different from identity or is not able to return the encryption key ss', in order not to compromise the security of the PIN code.

The secret confirmation Know(ss) is sent to the server 3 (240, 240a) and verified thereby (245).

Figure 5:
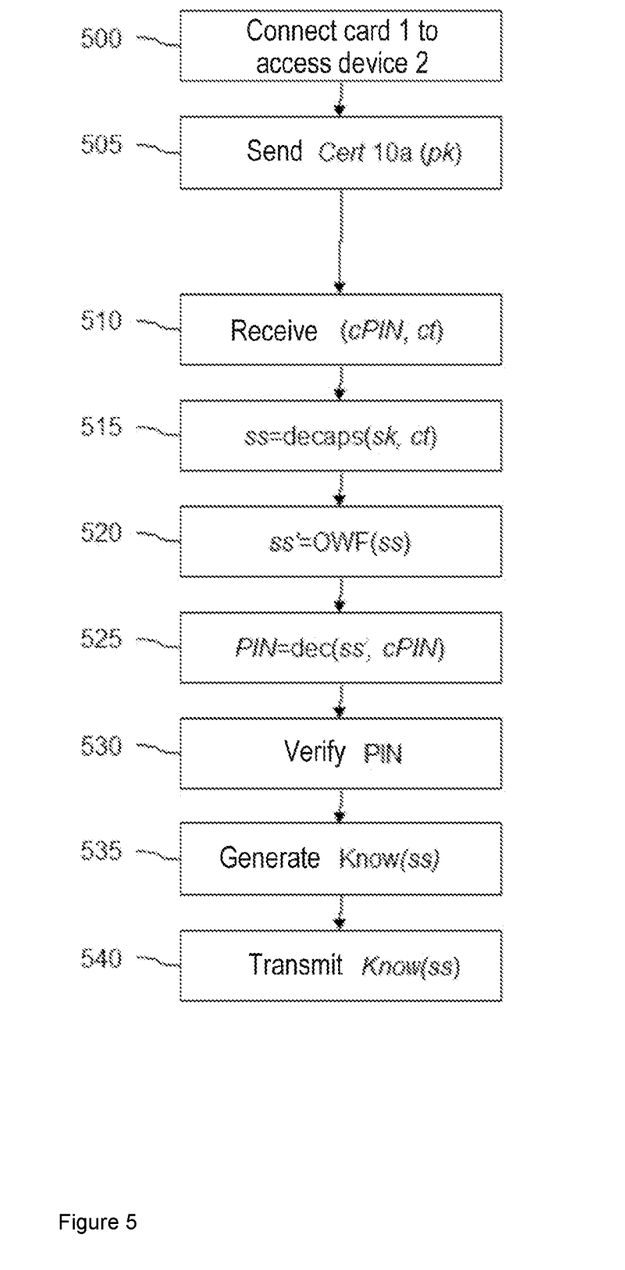
FIG. 5 shows, using a flowchart, general steps of an authentication method on a personal authentication device, according to one implementation of the invention.
Figure 6:
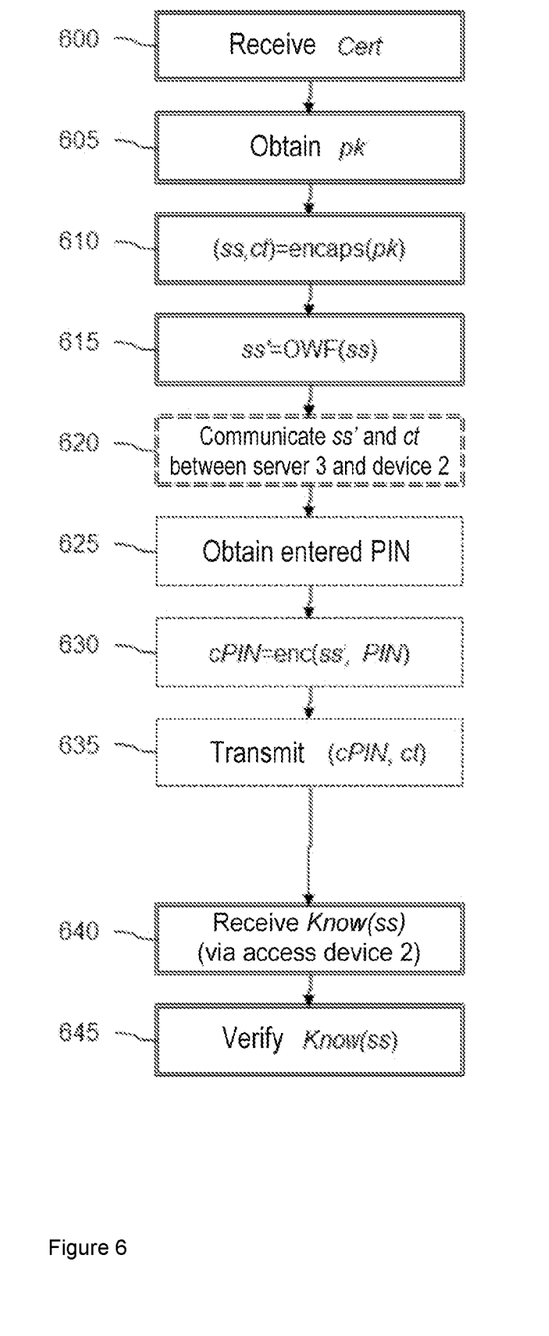
FIG. 6 shows, using a flowchart, general steps of an authentication method on a corresponding access system, according to one implementation of the invention.

FIGS. 5 and 6 illustrate, using flowcharts, general steps of one embodiment of the invention, respectively on the part of the portable object 1 (FIG. 5) and on the part of the access system (FIG. 6).

The access system of FIG. 6 consists for example of the access device 2, the steps of which are shown in dashed lines, and of the remote server 3, the steps of which are shown in double lines. The access device 2 is connected to the remote server 3 via the network 4. These figures adopt the scenario from FIG. 4.

In step 500, the user presents the portable object 1, for example a chip card, to the access device 2. This step supplies power to the chip card 1, which, in return, sends its certificate Cert to the access device 2, in step 505.

For its part, the access device 2 retransmits the certificate Cert to the remote device 3, of server type, in step 600.

In step 605, the server 3 extracts the public key pk from the certificate Cert. This simply involves verifying the signature of the certificate with a public key $pk_{CA}$ of the certification authority: verif($pk_{CA}$, Cert) which returns the key pk extracted from the certificate. Conventional mechanisms may be used.

Of course, these steps may be omitted if the server 3 is already in possession of the public key pk.

In step 610, the server 3 generates a secret ss and a corresponding cipher ct using a key encapsulation mechanism, KEM (encaps), and the public key pk of the user that is thus retrieved: (ss, ct)=encaps(pk).

In step 615, the server 3 generates the encryption key ss' by deriving the secret ss using a predefined one-way function (that is known to the chip card 1): ss'=OWF(ss).

Steps 605-615 correspond to step 415 of FIG. 4.

The cipher ct and the encryption key ss' are transmitted to the access device 2 in step 620.

The access device receives an authentication datum from the user, typically a PIN code or password entered by the user via the user interface 23 or an acquired biometric datum in step 625. This step may however be carried out earlier between steps 600 and 620.

The access device 2 encrypts the PIN code in step 630 using the key ss': cPIN=enc(ss', PIN) (step 425 in FIG. 4). The ciphers ct and cPIN are then transmitted to the chip card 1 in step 635.

For its part, the chip card 1 receives, from the access device 2, the encrypted personal authentication datum cPIN and a cipher ct (generated by KEM), in step 510.

In step 515, it obtains the secret ss through KEM decapsulation of the cipher ct using its private key sk stored in the memory of the portable object: ss=decaps(sk, ct).

Next, in step 520, it generates the encryption key ss' (for decrypting cPIN) by applying the one-way function to the secret ss obtained using the KEM: ss'=OWF(ss). The chip card 1 is then able to decrypt (step 525), using this key ss', the encrypted personal authentication datum, here cPIN, in order to retrieve the PIN code entered by the user: PIN=dec (ss•, cPIN).

In step 530, the chip card 1 verifies the decrypted personal authentication datum, i.e. PIN, with the reference personal authentication datum 10b ($PIN_{ref}$). This simply involves verifying that PIN and $PIN_{ref}$ are the same.

In the event of an erroneous verification, an error message is returned to the access device 2, ending and declining the authentication.

In the event of a valid personal authentication datum (positive verification 530), the chip card 1 generates, in step 535, a confirmation of the secret ss, typically Know(ss).

Steps 510-535 correspond to step 435 of FIG. 4.

This secret confirmation is sent to the access device 2 in step 540 and retransmitted to the server 3 in step 640. In step 645, the server 3 verifies the secret confirmation in order to validate (or not validate) the authentication.

For example, the server generates a reference confirmation from the secret ss generated in step 610: Know(ss)$_{ref}$, and compares it with the confirmation received in step 640. The authentication is validated if they are the same, and declined if they are different.

In the proposed scheme, doing away with execution of the decapsulation function for the benefit of executing the one-way function is beneficial since the latter is less expensive in terms of resources and also constitutes a basic cryptographic function that is generally already present in any cryptographic module constituting a portable authentication object 1.

Figure 7:
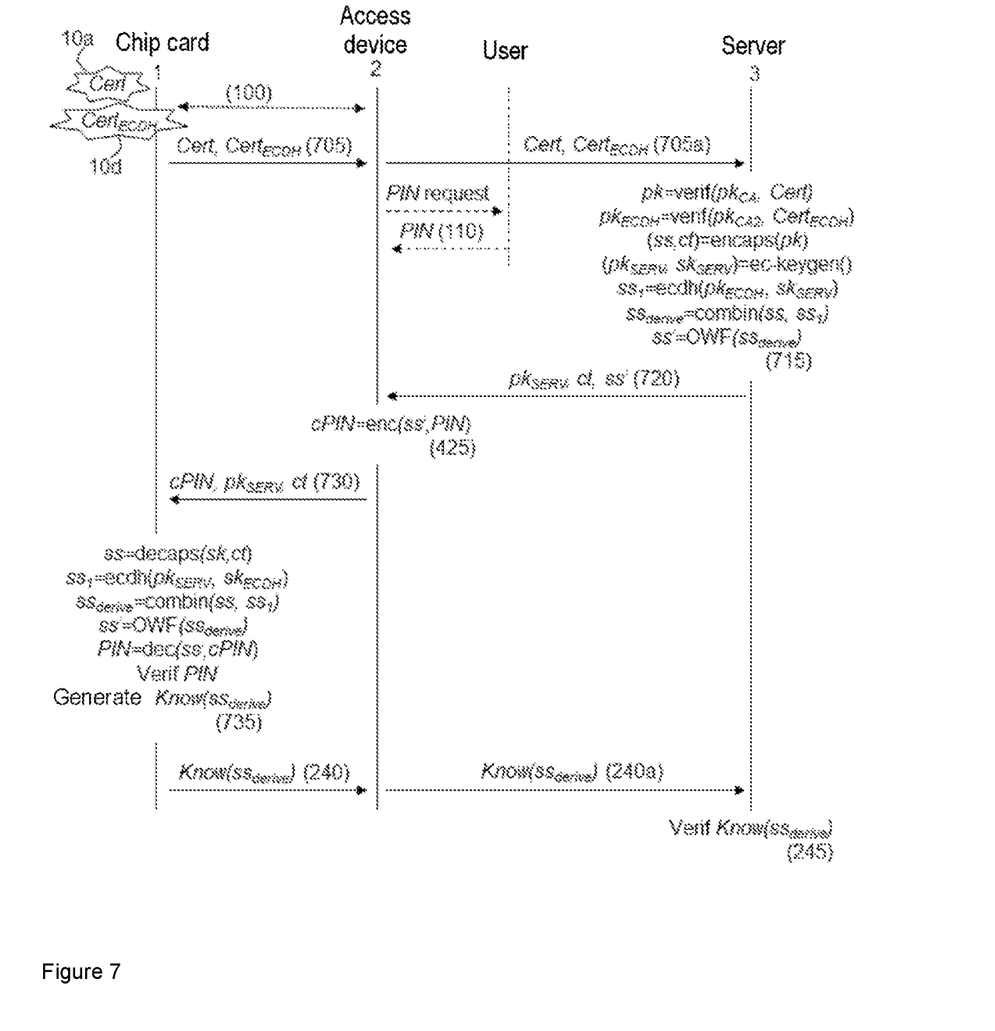
FIG. 7 illustrates a strong authentication scheme according to one alternative implementation of the invention.

FIG. 7 illustrates a two-factor strong authentication scheme according to another embodiment of the invention. In this embodiment, the derived secret combines the secret obtained using the KEM with at least one second secret shared between the portable object and the remote device and obtained using a pre-quantum cryptographic algorithm.

This embodiment is said to be "hybrid" in that it combines, for the authentication factor based on the secret confirmation, the security of a post-quantum scheme (via the KEM) and the security of a conventional pre-quantum scheme (illustrated here by the ECDH (for "Elliptic Curve Diffie-Hellman", a mechanism that makes it possible to establish a shared secret using asymmetric key pairs of the two entities involved). This hybrid scheme makes it possible to guarantee at least the security of a conventional scheme for the case where the post-quantum mechanisms might prove to be more easily attackable than set forth in the current literature.

This hybrid security therefore requires setting up another asymmetric key pair ($pk_{ECDH}$, $sk_{ECDH}$) on the part of the portable device 1 (represented by the certification $Cert_{ECDH}$ 10d in the figure). The server 3 also has an asymmetric key pair to achieve security in accordance with a conventional scheme, for example ECDH. This pair ($pk_{SERV}$, $sk_{SERV}$) may be predefined or generated on demand as described below.

The ECDH scheme is used below as one example of a conventional scheme for establishing a shared secret. Similar mechanisms may be used within the scope of this embodiment.

The certificate $Cert_{ECDH}$ 10d is therefore transmitted, at the same time as Cert 10a, to the server 3 via the access device 2 (step 705, 705a). The certificate Cert 10a, used in a post-quantum scheme, is preferably signed with a post-quantum signature algorithm, while the certificate $Cert_{ECDH}$ 10d, used in a conventional pre-quantum scheme, is preferably signed with a conventional pre-quantum signature algorithm.

In one variant embodiment, a single certificate may be used, which contains the two public keys pk and $pk_{ECDH}$ accompanied by two respective signatures.

In step 715, the server 3 obtains the two public keys pk and $pk_{ECDH}$ from the user (via the certificates for example) and generates its own asymmetric key pair ($pk_{SERV}$, $sk_{SERV}$) if necessary using any conventional mechanism: ($pk_{SERV}$, $sk_{SERV}$)=ec-keygen( ).

Similarly to step 415, the server 3 generates the authentication secret ss and its cipher ct ((ss, ct)=encaps(pk)).

It also generates a second authentication secret, $ss_1$, based on a conventional cryptography scheme, ECDH in the example: $ss_1$=ecdh($pk_{ECDH}$, $sk_{SERV}$).

The server 3 may then generate the encryption key ss' (used to protect the PIN code) from the secrets ss and $ss_1$ and using a one-way function OWF.

In practice, the server may first combine the two secrets ss and $ss_1$ to form a combined secret $ss_{derive}$: $ss_{derive}$=combin(ss, $ss_1$). Various combination functions may be used, for example a simple concatenation, a binary logic operation, an arithmetic operation, etc. (preferably a simple concatenation).

The server then computes the encryption key from the combined secret: ss'=OWF($ss_{derive}$).

The encryption key ss' is then transmitted to the access device 2, with the cipher ct and the public key of the server $pk_{SERV}$, both needed for the server authentication based on the hybrid scheme (step 720).

Following encryption of the PIN code by the access device (425), the ciphers cPIN and ct are transmitted to the portable object 1 with the public key of the server $pk_{SERV}$ (730).

The portable object 1 may then (735):
retrieve the secret ss from the cipher ct: ss=decaps(sk, ct),
retrieve the second secret $ss_1$ from the public key $pk_{SERV}$: $ss_1$=ecdh($pk_{SERV}$, $sk_{ECDH}$),
obtain the combined secret: $ss_{derive}$: $ss_{derive}$=combin(ss, $ss_1$),
and then obtain the encryption key ss': ss'=OWF($ss_{derive}$).

The portable object 1 then has the two secrets needed for the two authentication factors.

Still in step 735, it decrypts cPIN using this key ss' to obtain the entered PIN code: PIN=dec(ss•, cPIN). A conventional comparison between the PIN code thus retrieved and the reference PIN code 10b is carried out in order to validate or not validate the first authentication factor. If this first authentication is validated, the operations continue with the generation of the secret confirmation.

In this hybrid scheme, the secret confirmation is not only based on the secret of the post-quantum scheme ss, but also based on the secret of the conventional scheme $ss_1$. Any combination (known to the portable device 1 and to the server 3) of these two secrets may be used. In particular, the combined secret $ss_{derive}$ that has already been computed may be used: Know($ss_{derive}$).

The secret confirmation Know($ss_{derive}$) is transmitted to the server 3 (240, 240a) and verified thereby (245).

In this hybrid embodiment, the methods of FIGS. 5 and 6 are also carried out, plus the additional steps described above.

Although the present invention has been described above with reference to specific embodiments, the present invention is not limited to these specific embodiments, and modifications that fall within the scope of the present invention will be obvious to a person skilled in the art.

In particular, the authentication scheme proposed here preferably implements a post-quantum key encapsulation mechanism (KEM), for example one of the final candidates in the Post-Quantum Cryptography Standardization competition organized by the NIST. The present invention also applies to conventional (non-quantum or post-quantum) cryptography insofar as there are also KEMs in traditional cryptography.

Many other modifications and variations will become clear to a person skilled in the art on referring to the above illustrative embodiments, which are given merely by way of example and which do not limit the scope of the invention, said scope being defined solely by the appended claims. In particular, the various features of the various embodiments may be exchanged, where appropriate.

In the claims, the word "comprising" does not exclude other elements or steps, and the indefinite article "a" or "an" does not exclude a plurality. The simple fact that different features are mentioned in different mutually dependent claims does not indicate that a combination of these features cannot be used advantageously.

The invention claimed is:

1. A method for authenticating a user with a remote device, comprising the following steps on a portable object storing a reference personal authentication datum:
receiving, from an access device, an encrypted personal authentication datum (cPIN) and a cipher (ct) generated by the remote device,
decrypting the encrypted personal authentication datum (cPIN) using a cryptographic key (ss'), and
in the event of a valid personal authentication datum, sending, to the remote device, a confirmation (Know (ss)) of a secret (ss) obtained using a key encapsulation mechanism, KEM, applied to said cipher (ct),
wherein the cryptographic key (ss') is generated, at the portable object, by applying a one-way function (OWF) to a secret derived from the secret (ss) obtained using the KEM through KEM decapsulation,
wherein the remote device generates the secret (ss) using the KEM through KEM encapsulation and applies the one-way function to a secret derived from the secret (ss) to obtain the cryptographic key (ss') which is provided to the access device, and the access device generates the encrypted personal authentication datum (cPIN) by encrypting a personal authentication datum (PIN), received from the user, using the cryptographic key (ss').

2. The method according to claim 1, furthermore comprising the following step: the portable device obtaining the secret (ss) through KEM decapsulation of the cipher (ct) using a private key (sk) of a private key/public key scheme stored in the memory of the portable object.

3. The method according to claim 1, furthermore comprising the following step: verifying the decrypted personal authentication datum (PIN) with the reference personal authentication datum.

4. The method according to claim 1, furthermore comprising the following step: generating the secret confirmation (Know (ss)) by applying a hash function to the obtained secret or to any other key derived from the obtained secret, or by encrypting a predetermined datum using the obtained secret or any other key derived from the obtained secret.

5. The method according to claim 1, wherein the derived secret is the secret (ss) obtained using the KEM.

6. The method according to claim 1, wherein the derived secret ($ss_{derive}$) combines the secret (ss) obtained using the KEM with at least one second secret (ss1) shared between the portable object and the remote device and obtained using a pre-quantum cryptographic algorithm.

7. The method according to claim 6, wherein the second shared secret (ss1) is obtained using an elliptic curve Diffie-Hellman key exchange.

8. The method according to claim 6, wherein the secret confirmation is based on the secret (ss) obtained using the KEM and on the second shared secret (ss1).

9. The method according to claim 8, wherein the secret confirmation is based on the derived secret ($ss_{derive}$).

10. A method for authenticating a user with a remote device, using a portable object storing a reference personal authentication datum, comprising the following steps:
    generating, by way of the remote device, a secret (ss) and a corresponding cipher (ct) using a key encapsulation mechanism, KEM, and a public key (pk) of the user, wherein the remote device generates the secret (ss) using the KEM through KEM encapsulation and applies a one-way function (OWF) to a secret derived from the secret (ss) to obtain the cryptographic key (ss') which is provided to an access device,
    obtaining, by way of the access device connected to the portable object, a personal authentication datum (PIN) entered by the user,
    encrypting the entered personal authentication datum by way of the access device and using the cryptographic key (ss'),
    transmitting, to the portable object, the encrypted authentication datum (cPIN) and the cipher (ct) corresponding to the secret (ss), and
    receiving, in return, a confirmation (Know (ss)) of the secret (ss) from the portable object,
    wherein the cryptographic key (ss') is generated, at the portable object, by applying the one-way function (OWF) to a secret derived from the secret (ss) obtained using the KEM through KEM decapsulation, and the portable object decrypts the encrypted personal authentication datum (cPIN) using the cryptographic key (ss') to determine whether the personal authentication datum is valid in order to send the confirmation (Know (ss)) of the secret (ss) to the remote device.

11. The method according to claim 10, comprising verifying, by way of the remote device, the secret confirmation (Know (ss)) received in return, with the generated secret (ss), so as to positively authenticate the portable object in the event of a positive verification.

12. A personal authentication device for authenticating a user with a remote device, comprising a memory storing a reference personal authentication datum and a processor configured to:
    receive, from an access device, an encrypted personal authentication datum (cPIN) and a cipher (ct) generated by the remote device, and
    decrypt the encrypted personal authentication datum (cPIN) using a cryptographic key (ss'),
    wherein in the event of a valid personal authentication datum, send, to the remote device, a confirmation (Know (ss)) of a secret (ss) obtained using a key encapsulation mechanism, KEM, applied to said cipher (ct),
    wherein it is furthermore configured to generate the cryptographic key (ss') at the personal authentication device by applying a one-way function (OWF) to a secret derived from the secret (ss) obtained using the KEM through KEM decapsulation, and
    wherein the remote device generates the secret (ss) using the KEM through KEM encapsulation and applies the one-way function to a secret derived from the secret (ss) to obtain the cryptographic key (ss') which is provided to the access device, and the access device generates the encrypted personal authentication datum (cPIN) by encrypting a personal authentication datum (PIN), received from the user, using the cryptographic key (ss').

13. An authentication system for authenticating a user using a portable object storing a reference personal authentication datum, comprising an access device and a remote device,
    the remote device comprising a processor configured to:
        generate a secret (ss) and a corresponding cipher (ct) using a key encapsulation mechanism, KEM, and a public key (pk) of the user, wherein the remote device generates the secret (ss) using the KEM through KEM encapsulation and applies a one-way function (OWF) to a secret derived from the secret (ss) to obtain a cryptographic key (ss') which is provided to the access device, and
        authenticate the portable object by verifying a confirmation (Know (ss)) of the secret (ss) issued by the portable object, and
    the access device being connected to the portable object and comprising a processor configured to:
        obtain a personal authentication datum (PIN) entered by the user,
        encrypt the entered personal authentication datum (PIN) using the cryptographic key (ss'),
        transmit, to the portable object, the encrypted authentication datum (cPIN) and the cipher (ct) corresponding to the secret (ss), and
        receive, in return, the confirmation (Know (ss)) of the secret (ss) from the portable object,
    wherein the authentication system is configured to generate, at the portable object, the cryptographic key (ss') by applying the one-way function (OWF) to a secret derived from the secret (ss) obtained using the KEM through KEM decapsulation, and the portable object decrypts the encrypted personal authentication datum (cPIN) using the cryptographic key (ss) to determine whether the personal authentication datum is valid in order to send the confirmation (Know (ss)) of the secret (ss) to the remote device.

14. A non-transient computer-readable medium storing a program that, when it is executed by a processor of a cryptographic processing device, causes the cryptographic processing device to carry out the method according to claim 1.

* * * * *